US005335800A

United States Patent [19]

Liu

[11] Patent Number: 5,335,800

[45] Date of Patent: Aug. 9, 1994

[54] MAGAZINE FOR RIVET GUN

[76] Inventor: Chung-ho Liu, No. 15, Nan-Chien Rd., Ting-Tai Tsun, Wu-Feng Hsien, Taichung Hsien, Taiwan

[21] Appl. No.: 86,051

[22] Filed: Jul. 6, 1993

[51] Int. Cl.[5] .............................................. B65G 59/00

[52] U.S. Cl. .................................... 221/279; 221/198; 227/120

[58] Field of Search ............... 221/197, 198, 279, 226, 221/227, 232; 29/809, 812.5, 816–818; 227/120, 123, 125, 126

[56] References Cited

U.S. PATENT DOCUMENTS 3,272,417 9/1966 Howard et al. ..................... 227/123
3,615,049 10/1971 Obergfell et al. ................... 227/120
3,633,811 1/1972 Ploen .................................. 227/120
3,905,535 9/1975 Novak et al. ....................... 227/120
4,160,317 7/1979 Sergeant .............................. 29/816
4,197,974 4/1980 Morton ............................... 227/120

*Primary Examiner*—H. Grant Skaggs
*Attorney, Agent, or Firm*—Bacon & Thomas

[57] ABSTRACT

A magazine for a rivet gun, generally comprised of a magazine body, a catch, a pusher, a stopper, a coil spring and a muzzle, wherein the magazine body includes a guide plate and a cover plate, the catch being controlled by the stopper and engaged with one end of the magazine body, a coil spring inserted at one end in the catch being able to apply the action of returning to its original form to move the pusher forward, thereby pushing the rivets along the pushing slot of the cover plate to the muzzle in an intermittent manner.

1 Claim, 3 Drawing Sheets

MAGAZINE FOR RIVET GUN

BACKGROUND OF THE INVENTION

The present invention relates to a magazine for a rivet gun, and more particularly to an improved magazine structure for a rivet gun.

Referring to FIG. 1, a magazine for a rivet gun according to the prior art is of closed type for loading rivets. Stopper (A) must be pulled up and cover plate (B) be pulled down before loading rivets in the guiding piece (C). Then, the cover plate (B) must be pushed upward to use a pusher (D) and a spring (E) disposed therein for feeding rivets to the muzzle means (F). It is very complicated and time-consuming. In practice, some disadvantages are found as follows:

1. As the loading of rivets is of closed type, one can not know how many rivets remain, frequently leading to a suspension in operation.

2. When rivets are used up, it is labor- and time-consuming for reloading.

SUMMARY OF THE INVENTION

The present invention has been accomplished under the aforesaid circumstances. It is the main object of the present invention to provide a magazine for rivet gun which is improved in structure.

It is another object of the present invention to provide a magazine for rivet gun which is of open type for loading rivets, thus enabling the operator to know how many rivets are remain at any time.

It is still another object of the present invention to provide a magazine for rivet gun which is simplified in the operation of rivets. When rivets are used up, reloading can be made and completed only by pressing down and releasing a catch means, thus obtaining the efficiency of saving time and labor.

DETAILED DESCRIPTION OF THE PREFERRED EMBODIMENT

Figure 1:
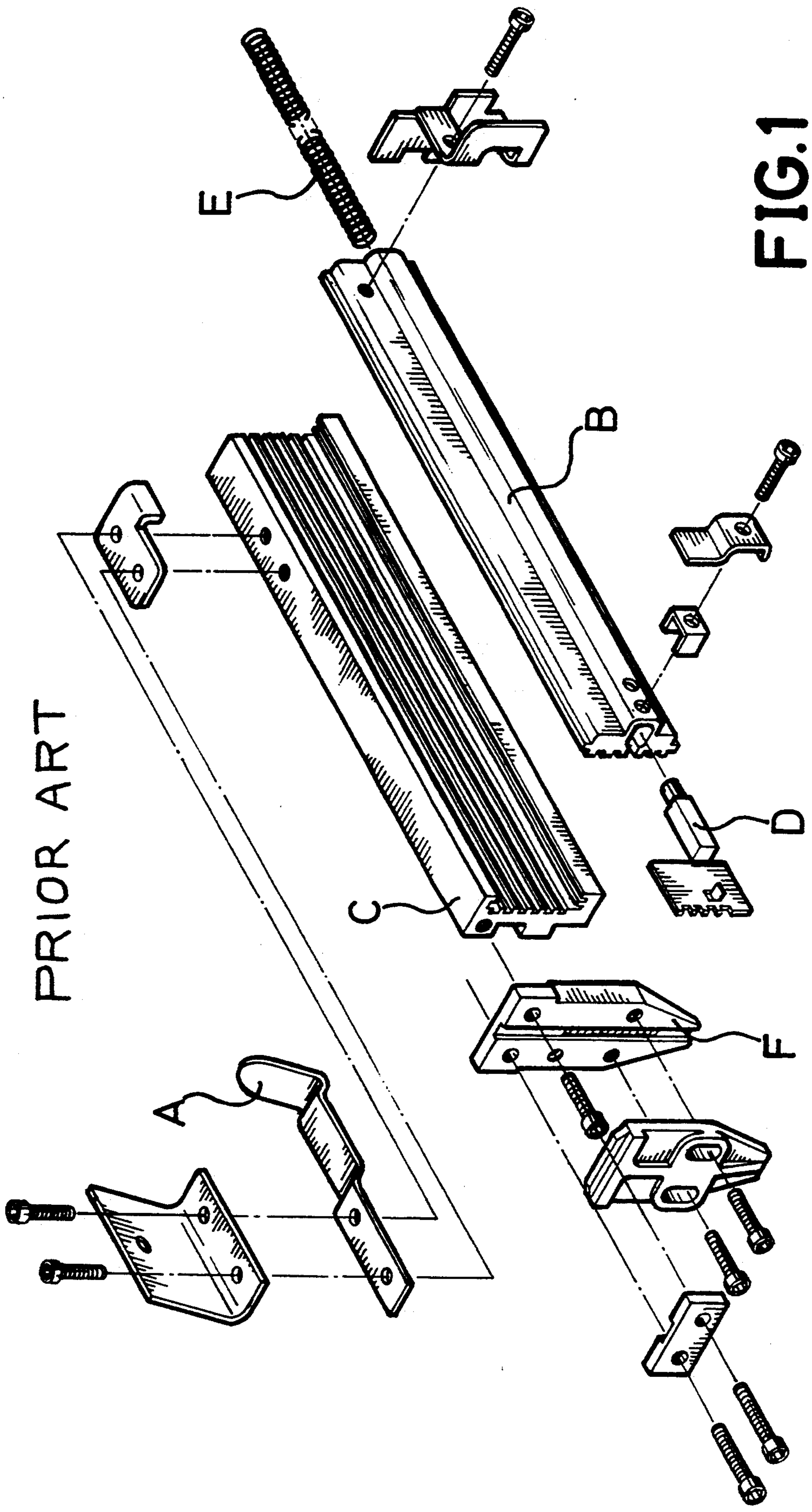
FIG. 1 is the exploded view of a magazine for rivet gun in accordance with the prior art.
Figure 2:
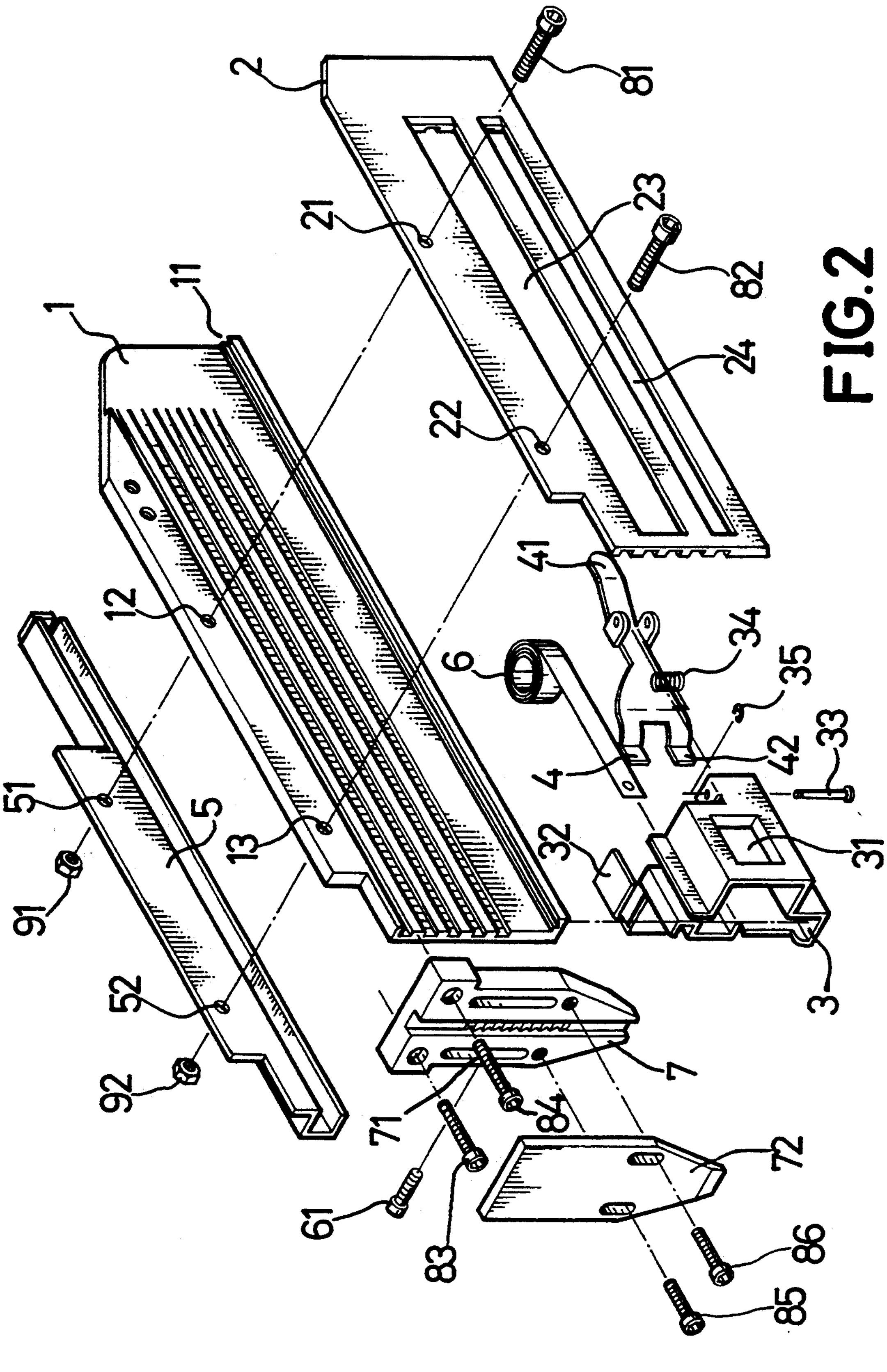
FIG. 2 is the exploded view of a magazine for rivet gun in accordance with the present invention.
Figure 3:
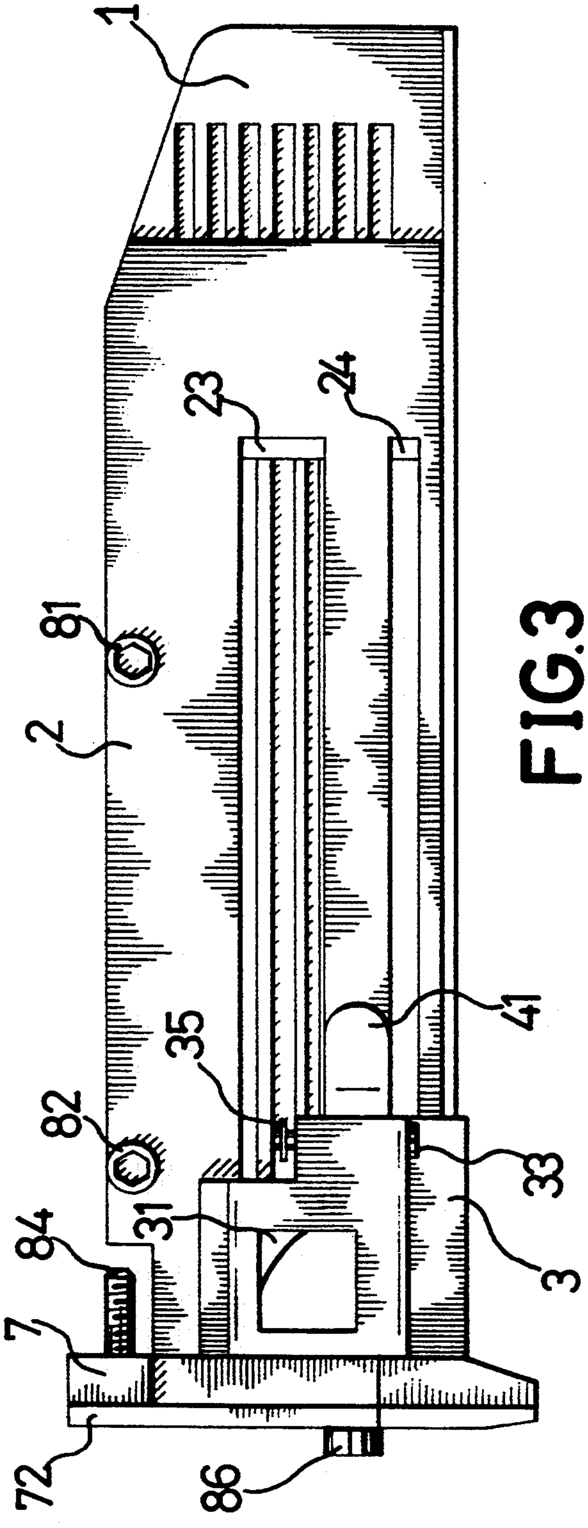
FIG. 3 is an elevational side view of a magazine for rivet gun in accordance with the present invention.

Referring to FIG. 2, a magazine for rivet gun according to the present invention is comprised of a guide plate 1, a cover plate 2, a catch means 3, a pusher 4, a stopper 5, a coil spring 6 and a muzzle means 7.

The guide plate 1 has a dovetail groove 11 at the front end thereof to allow the cover plate 2 for joining thereto. The cover plate 2 is provided with holes 21, 22 corresponding to the holes 12, 13 on the guide plate 1 and the holes 51, 52 on the stopper 5, respectively. After screws 81, 82 pass through these holes, nuts 91, 92 are used to hold them together thus forming, a magazine body. The stopper 5 mainly functions to guide the movement made by the catch means 3 in the correct direction, preventing such movement from deviating. The catch means 3 having a finger hole 31 at one side and a catch piece 32 at the opposite thereof is engaged with one end of the magazine body. Both finger hole 31 and catch piece 32 are designed to help load the rivets. Further, the catch piece 32 can also be used for insertion therein of a coil spring 6 which is secured at the other end by a screw 61 in a slot 71 of the muzzle means 7. By the action of returning to its original form, the coil spring 6 can have rivets pushed forward intermittently and firmly held to the magazine body. On the catch means 3, a set pin 33 passes through a torsional spring 34 and a C-shaped retaining ring 35 to hold the pusher 4 in place. The pusher 4 has a release member 41 formed at the lower end thereof. When the remaining rivets in the magazine body are not used after work, they can be unloaded by pressing down the release member 41. A guiding portion 42 is formed at the front end of the pusher 4, and the cover plate 2 is cut to form a pushing slot 23 and a guiding slot 24. The pusher 4 can be placed into and moved along the pushing slot 23 for pushing rivets forward, and the guiding portion 42 be placed into and moved along the guiding slot 24 for preventing the movement direction of the rivets from deviating. The muzzle means 7 is fixed to the rivet gun by screws 83, 84, and a muzzle cover 72 is attached to the muzzle means 7 by screws 85, 86.

Figure 4:
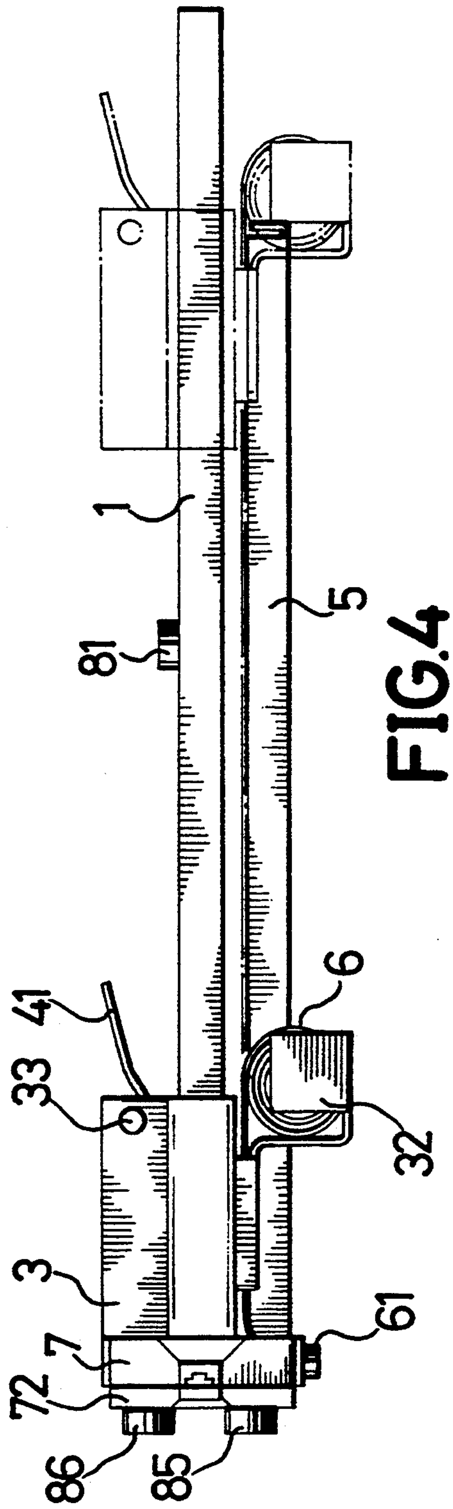
FIG. 4 is a bottom plan view showing how a magazine for rivet gun according to the present invention is operated.

Referring to FIG. 4, the catch means 3 may, upon loading rivets, be pulled down to the position as shown in dotted line, and be released after the rivets have been loaded into the magazine body. Then, by the action of returning to its original form, the coil spring 6 inserted in the catch piece 32 can push rivets up to the muzzle means 7 where they are positioned for use.

What is claimed is:

1. A magazine assembly for a rivet gun comprising:

a) a magazine body for storing rivets, the magazine body including a forward end, a guide plate, a cover plate having a pushing slot and a guiding slot formed therein, and a stopper;

b) a muzzle means mounted to a forward end of the magazine body for receiving rivets from the magazine body and guiding the rivets to a rivet gun;

c) a catch means mounted to the magazine body for movement therealong, the catch means including a finger hole and a catch piece positioned on opposite sides thereof, and the movement of the catch means being guided by the stopper;

d) a pusher secured to the catch means for movement along the pushing slot of the cover plate for pushing rivets forwardly to the muzzle means, the pusher including a guiding portion for movement along the guiding slot of the cover plate to prevent deviation of the rivets from their direction of forward movement; and e) a coil spring carried by the catch means, the coil spring including an end secured to the muzzle means for urging the catch means and rivets towards the muzzle means.

* * * * *